United States Patent [19]
Reed et al.

[11] Patent Number: 5,100,678
[45] Date of Patent: Mar. 31, 1992

[54] CHEWING GUM WITH PROLONGED FLAVOR RELEASE INCORPORATING UNSATURATED, PURIFIED MONOGLYCERIDES

[75] Inventors: Michael A. Reed, Evanston; Jeffrey S. Hook, Palos Hills, both of Ill.

[73] Assignee: Wm. Wrigley Jr. Company, Chicago, Ill.

[21] Appl. No.: 613,301

[22] Filed: Nov. 15, 1990

[51] Int. Cl.$^5$ ............................................. A23G 3/30
[52] U.S. Cl. ........................................ 426/3; 426/654
[58] Field of Search ........................ 426/3-6, 426/654

[56] References Cited

U.S. PATENT DOCUMENTS

| | | | |
|---|---|---|---|
| 3,930,026 | 12/1975 | Clark | 426/3 |
| 4,352,822 | 10/1982 | Cherukuri et al. | 426/3 |
| 4,357,355 | 11/1982 | Koch et al. | 426/4 |
| 4,378,374 | 3/1983 | Reggio et al. | 426/6 |
| 4,379,169 | 5/1983 | Reggio et al. | 426/3 |
| 4,518,615 | 5/1985 | Cherukuri et al. | 426/6 |
| 4,698,223 | 10/1987 | Perfetti et al. | 426/4 |
| 4,752,481 | 6/1988 | Dokuzovic | 426/3z |
| 4,952,407 | 8/1990 | Record | 426/5 |

FOREIGN PATENT DOCUMENTS

| | | | |
|---|---|---|---|
| 0021559 | 2/1981 | Japan | 426/4 |
| 9004926 | 5/1990 | PCT Int'l Appl. | 426/5 |

OTHER PUBLICATIONS

Brochure entitled, "Food Emulsifiers" by Eastman Chemical Products, Inc. (undated).
Article entitled, "A Short Course in Organic Chemistry," pp. 198-209, Hart & Schuetz, Riverside Press, Cambridge, MA (1959).
Article entitled, "Standards for Fats and Oils," Avi Publishing Company, pp. 1-11 (1985).
Three pages hand captioned, "More Info on Fats and Oils," from unspecified text references.

*Primary Examiner*—Jeanette Hunter
*Attorney, Agent, or Firm*—Willian Brinks Olds Hofer Gilson & Lione

[57] ABSTRACT

Chewing gum compositions using unsaturated, purified monoglycerides to prolong the flavor release of the gum compositions are disclosed. In the preferred embodiments, gums contain from about 0.1% to 1.0% unsaturated, purified monoglycerides. Preferably the monoglycerides are purified to have greater than 90% monoglycerides. Preferably the unsaturated, purified monoglycerides have an Iodine Value of between about 50 and about 115.

11 Claims, No Drawings

CHEWING GUM WITH PROLONGED FLAVOR RELEASE INCORPORATING UNSATURATED, PURIFIED MONOGLYCERIDES

BACKGROUND OF THE INVENTION

The present invention relates to flavored chewing gum compositions having improved flavor perception. More particularly, it relates to gum compositions containing unsaturated, purified monoglycerides to prolong the flavor release of the gum.

Over the years, a considerable amount of developmental activities have involved the preparation of gum compositions with improved flavor release characteristics. One desired outcome has been to prolong the release of flavor so as to make the gum more enjoyable to chew over a longer period of time.

Some efforts have been made to prevent the flavor oils from becoming bound in the gum base, from which they are only partially released. For example, U.S. Pat. No. 4,752,481 to Dokuzovic discloses an emulsion system wherein the flavor is premixed with an emulsifier and an alkyl polyol before it is mixed into the gum. Suggested emulsifiers included fatty acid esters and mono and diglycerides, specifically glycerol monooleate, propylene glycol monostearate, glycerol monostearate, lecithin and sorbitan monostearate.

Another approach is disclosed in U.S. Pat. No. 3,930,026 to Clark, which teaches sorbing the flavor on a hydrophilic colloid in conjunction with a surfactant, such as polyoxyethylene (20) sorbitan monostearate, polyoxyethylene (20) sorbitan monooleate, fatty acid monoglycerides or fatty acid diglycerides.

Some glycerides have been suggested for special uses in gum. For example, U.S. Pat. No. 4,379,169 to Reggio et al. discloses the use of plasticizing agents to be employed with gums made with gum base having high levels of ester gums. The plasticizers, which are said to provide film forming properties important in bubble gum, include fatty acids, glycerol esters of fatty acids and polyglycerol esters of fatty acids, with glycerol monooleate being preferred.

Monoglycerides have been commonly used as softeners for gum base. Monoglycerides are fatty molecules which consist of a single fatty acid molecule esterified to a glycerol molecule. The term "monoglycerides" is somewhat of a misnomer. In the past, the monoglycerides used in chewing gum were mixtures of mono, di and triglycerides of fatty acids esters of varying degrees of saturation and unsaturation, reflecting their natural origin. Saturated glycerides, like glycerol monostearate, glycerol monopalmitate, etc. are commonly used in chewing gum as emulsifiers. These saturated monoglycerides contain different levels of di and triglycerides, depending on their origin.

It has been known that through purification processes, such as molecular distillation, mono, di and triglycerides could be separated. However, this adds to the cost of the monoglycerides, and since no benefit was expected from the use of more purified monoglycerides in chewing gum, the unseparated product is used.

SUMMARY OF THE INVENTION

It has now been found that the use of unsaturated, purified monoglycerides conveys the unique and unexpected benefit of longer lasting flavor to chewing gums which incorporate this ingredient. Thus, a flavored chewing gum composition of the present invention has an improved flavor perception. The gum composition comprises a gum base, a sweetener, a flavoring agent and an amount of unsaturated, purified monoglycerides effective to prolong the flavor release of the flavoring agent compared to its release from the composition without the unsaturated, purified monoglycerides. In preferred embodiments, the gum will include from about 0.1% to about 1% of the purified monoglycerides, which are preferably greater than 90% monoglycerides and preferably have an Iodine Value of between about 50 and about 115. The present invention also includes processes for making the gum composition.

The invention provides a simple, inexpensive method of prolonging flavor release from chewing gum.

DETAILED DESCRIPTION OF PREFERRED EMBODIMENTS OF THE INVENTION

Unless specified otherwise, all percentages herein are weight percents. Also, as used herein, the term chewing gum includes all forms of gum compositions, including bubble gum.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinyl acetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5 to about 95 percent by weight of the gum. More preferably, the insoluble gum base comprises between 10 and 50 percent by weight of the gum and, most preferably, about 20 to about 35 percent by weight of the gum.

The gum base typically also includes a filler component. The filler component may be calcium carbonate, magnesium carbonate, talc, dicalcium phosphate or the like. The filler may constitute between about 5 and about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base. However, the amount and type of unsaturated, purified monoglycerides necessary to prolong flavor duration may depend on the glyceride content of the gum base.

The water-soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerine, lecithin, and combinations thereof. Further, aqueous sweetener solutions such as those containing sorbitol, hydrogenated starch hydrolysates, corn syrup and combinations thereof may be used as softeners and binding agents in gum.

The flavoring agent present in the chewing gum may be in an amount within the range of from about 0.1 to about 10.0 weight percent, and preferably from about 0.5 to about 3.0 weight percent, of the gum. The flavoring agents may comprise essential oils, synthetic flavors, or mixture thereof including, but not limited to, oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorially acceptable blend. All such flavors and flavor blends are contemplated by the present invention. Of course, some flavors may benefit more or less than others from the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with any syrup and a portion of the bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

Glycerine is a three carbon molecule, with each carbon having one OH group attached to it. Each OH group can form an ester with a fatty acid, a long chain hydrocarbon with an acid group.

When one OH group is replaced by a fatty acid, a monoglyceride results. Substitution of two OH groups by fatty acids, which may be the same or different acids, produces a diglyceride. Substitution of all three OH groups produces triglycerides.

In nature, fats and oils are a combination of mono, di and triglycerides. Also, the chemical reaction of fatty acids and glycerine produces a mixture of mono, di and triglycerides. Most of the fatty acids found in natural oils and fats have an even number of carbon atoms, and are straight chained. The carbon chain may be saturated, or may contain one or more carbon-carbon double bonds.

A saturated fatty acid has no double bonds in its chemical structure. Generally, fatty acids are hydrogenated to saturate the double bonds. When hydrogenated, fatty acids from palm oil, lard, soybean oil, or vegetable oil are called hydrogenated palm oil, hydrogenated lard, etc. A fatty acid can also be partially hydrogenated to saturate some double bonds, but not all. A fatty acid that is not hydrogenated and still has one or more double bonds is unsaturated.

Whereas the prior art uses a combination of mono and di or even triglycerides, generally saturated, for softening the gum and other purposes, the present invention is directed to unsaturated or partially unsaturated, purified monoglycerides. As used herein, the term "purified" means that the level of monoglycerides in a mixture of mono, di and triglycerides has been enriched. The purified monoglycerides used in the present invention preferably contain at least 90% monoglycerides.

The unsaturated, purified monoglycerides preferably used in the present invention will have a melting point of less than 55° C., and more preferably of less than 50° C. Such materials can be prepared by distilling common mixtures of mono, di and triglycerides and separating the components. Useful unsaturated, purified monoglycerides may also be purchased from suppliers at greater than 90% monoglycerides. One such material is available from Eastman Kodak as distilled monoglycerides, sold under the trade name MYVEROL.

To determine whether a glyceride is saturated or unsaturated, its Iodine Value is determined. In the Iodine Value analysis, the amount of Iodine absorbed by the double bonds is measured, which evidences whether the fatty acid in the glyceride is saturated or unsaturated. For monoglycerides having an Iodine Value of less than 5, the fatty acid is saturated. An Iodine Value of about 50 would be found in a partially hydrogenated or partially saturated fatty acid monoglyceride. An Iodine Value of about 100 would be found in an unsaturated fatty acid monoglyceride. For this invention, purified monoglycerides having an Iodine Value of greater than 50 are needed, with an Iodine Value of greater than 70 being more preferred. The most preferred purified monoglycerides are monoglycerides having an Iodine Value of greater than 90. The Eastman Kodak distilled monoglycerides, MYVEROL 18-92, have an Iodine Value of 105-115.

The unsaturated, purified monoglycerides used should, of course, be of food grade quality.

The unsaturated, purified monoglyceride may be preblended with the gum base, where they also serve as a conventional softener. The recommended level is from about 0.5% to about 4% of the gum base, depending on the purified monoglycerides used and the characteristics of the gum base. In general, it is preferred that the purified monoglycerides be used at the highest level which does not produce excessive softening in the finished gum product.

The unsaturated, purified monoglycerides may also be added to the gum mass as opposed to being preblended in the base. When used in this manner, an early addition is preferred to provide a thorough and intimate mixing with the gum base. The preferred usage range is 0.1% to about 1% in the gum formulation, again depending on the purified monoglycerides used and the gum characteristics. Avoiding excessive softening is again the guideline. Partially saturated, purified monoglyceride having an Iodine Value of about 50-90 would require higher usage levels to have the same flavor prolongation effect as more unsaturated, purified monoglycerides. On the other hand, purified monoglycerides having an Iodine Value of 90-120 could be effective at lower levels.

EXAMPLE 1-4

The following formula was used for these examples.

|  | % |
| --- | --- |
| Gum base with natural gums | 20.2 |
| Sugar | 54.4 |
| Corn syrup | 13.3 |
| Glycerin | 1.3 |
| Dextrose Monohydrate | 9.9 |
| Peppermint flavor | 0.9 |
|  | 100.0 |

In comparative Example 1, no unsaturated purified monoglycerides were added. In Example 2, 0.5% saturated, purified monoglycerides (MYVEROL 18-06, Iodine Value=5 max.) were added. In Example 3, 0.5% moderately saturated, purified monoglycerides (MYVEROL 18-50, Iodine Value=50-60) were added. In Example 4, 0.5% unsaturated, purified monoglycerides (MYVEROL 18-92, Iodine Value=105-115) were added.

All samples were screened for flavor quality and flavor duration by a 2-member panel. Those samples having "significantly" longer duration were confirmed in a 24-member blind panel. Comparison of the three experimental samples showed that the gum of Example 2 had the same flavor quality and duration as the control gum (Example 1). The gum of Example 3 had the same flavor quality, but significantly longer duration than the control gum. The gum of Example 4 had very poor flavor quality compared to the control gum.

EXAMPLE 5-8

The following formula was used for these examples.

|  | % |
| --- | --- |
| Synthetic gum base with no natural gums | 20.2 |
| Sugar | 53.9 |
| Corn syrup | 13.3 |
| Glycerin | 1.3 |
| Dextrose monohydrate | 9.9 |
| Cocoa powder | 0.4 |
| Lecithin | 0.1 |
| Peppermint flavor | 0.9 |
|  | 100.0 |

In comparative Example 5, no purified monoglycerides were used. In Example 6, 0.5% saturated, purified monoglycerides (MYVEROL 18-06) were added. In Example 7, 0.5% moderately saturated, purified monoglycerides (MYVEROL 18-50) were added. In Example 8, 0.5% unsaturated, purified monoglycerides (MYVEROL 18-92) were added.

A comparison of the three experimental samples to the control (Example 5) showed that the gum of Example 6 had lower flavor quality and shorter gum duration. The gum of Example 7 had slightly longer duration and slightly lower flavor quality than the control gum. The gum of Example 8 had equally good flavor quality and significantly longer flavor duration compared to the control gum.

These examples demonstrate that moderately saturated and unsaturated, purified monoglycerides give improved flavor duration. Since the Example 8 material, using unsaturated, purified monoglycerides, appeared to produce better results than the Example 4 material, which used the same unsaturated, purified monoglycerides, a review of the gum base composition was conducted to see if that would explain the difference in preferred saturation ranges in the two sets of examples. The natural gum base of Examples 1-4 contained 3.7% hydrogenated cottonseed oil, 2.1% hydrogenated soybean oil and 1.6% glycerol monostearate. The synthetic gum base of Examples 5-8 contained 3.2% hydrogenated cottonseed oil and 4.7% glycerol monostearate. Considering the level of saturation and the amount of monoglycerides in each of these glycerides, it was concluded that the natural gum base of Examples 1-4 contributed about 0.3% less saturated glycerides to the gum than the synthetic gum base of Examples 5-8 contributed. Since Example 3, using moderately saturated, purified monoglycerides, appeared to give better results than Example 4, it is believed that the flavor prolongation is best when there are intermediate amounts of saturated monoglycerides in the combination of the unsaturated, purified monoglycerides added to the gum and any glycerides (such as glycerol monostearate) used to make the gum base. The preferred level of saturation in the purified monoglycerides added to the gum will thus be dependant on the saturation level and amount of other gum glycerides.

Presently, Examples 3 and 8 constitute the most preferred embodiments of the invention.

It should be appreciated that the compositions and methods of the present invention are capable of being incorporated in the form of a variety of embodiments, only a few of which have been illustrated and described above. The invention may be embodied in other forms without departing form its spirit or essential characteristics. The described embodiments are to be considered in all respects only as illustrative and not restrictive, and the scope of the invention is, therefore, indicated by the appended claims rather than the foregoing description. All changes which come within the meaning and range of equivalency of the claims are to be embraced within their scope.

We claim:

1. A flavored chewing gum composition having improved flavor perception comprising:
   a) a gum base comprising about 5% to about 95% of the gum,
   b) a sweetener,
   c) a flavoring agent comprising about 0.1% to about 10% of the gum, and
   d) an amount of unsaturated, purified monoglycerides having an Iodine Value of between about 50 and about 115 effective to prolong the flavor release of the flavoring agent compared to its release from the composition without the unsaturated, purified monoglycerides.

2. The gum composition of claim 1 wherein the purified monoglycerides are greater than 90% monoglycerides.

3. The gum composition of claim 1 wherein the purified monoglycerides comprises from about 0.1% to about 1% of the gum composition.

4. The gum composition of claim 1 wherein the purified monoglycerides have an Iodine Value of greater than about 70.

5. The gum composition of claim 1 wherein the purified monoglycerides are added to the gum at a level of between about 0.5% to about 4% of the gum base level.

6. A process for producing a chewing gum composition comprising the steps of:

a) providing a gum base comprising about 5% to about 95% of the gum composition, a sweetener, and a flavoring agent comprising about 0.1% to about 10% of the gum composition,
b) providing unsaturated, purified monoglycerides having an Iodine Value of between about 50 and about 115,
c) combining the gum base, sweetener, flavoring agent and unsaturated, purified monoglycerides to form a chewing gum composition, the amount of unsaturated, purified monoglycerides used being effective to prolong the flavor release of the flavoring agent compared to its release from the composition without the unsaturated, purified monoglycerides.

7. The process of claim 6 wherein the purified monoglycerides are blended with the gum base prior to the mixing in of other ingredients.

8. The process of claim 6 wherein the purified monoglycerides are greater than 90% monoglycerides.

9. The process of claim 6 wherein the purified monoglycerides comprise from about 0.1% to about 1% of the gum composition.

10. The process of claim 6 wherein the purified monoglycerides have an Iodine Value of greater than about 70.

11. The process of claim 6 wherein the purified monoglycerides are added to the gum at a level of between about 0.5% to about 4% of the gum base level.

* * * * *